July 6, 1943.  J. WOLFINGER, SR  2,323,760
VEGETABLE SLICER
Filed May 20, 1940
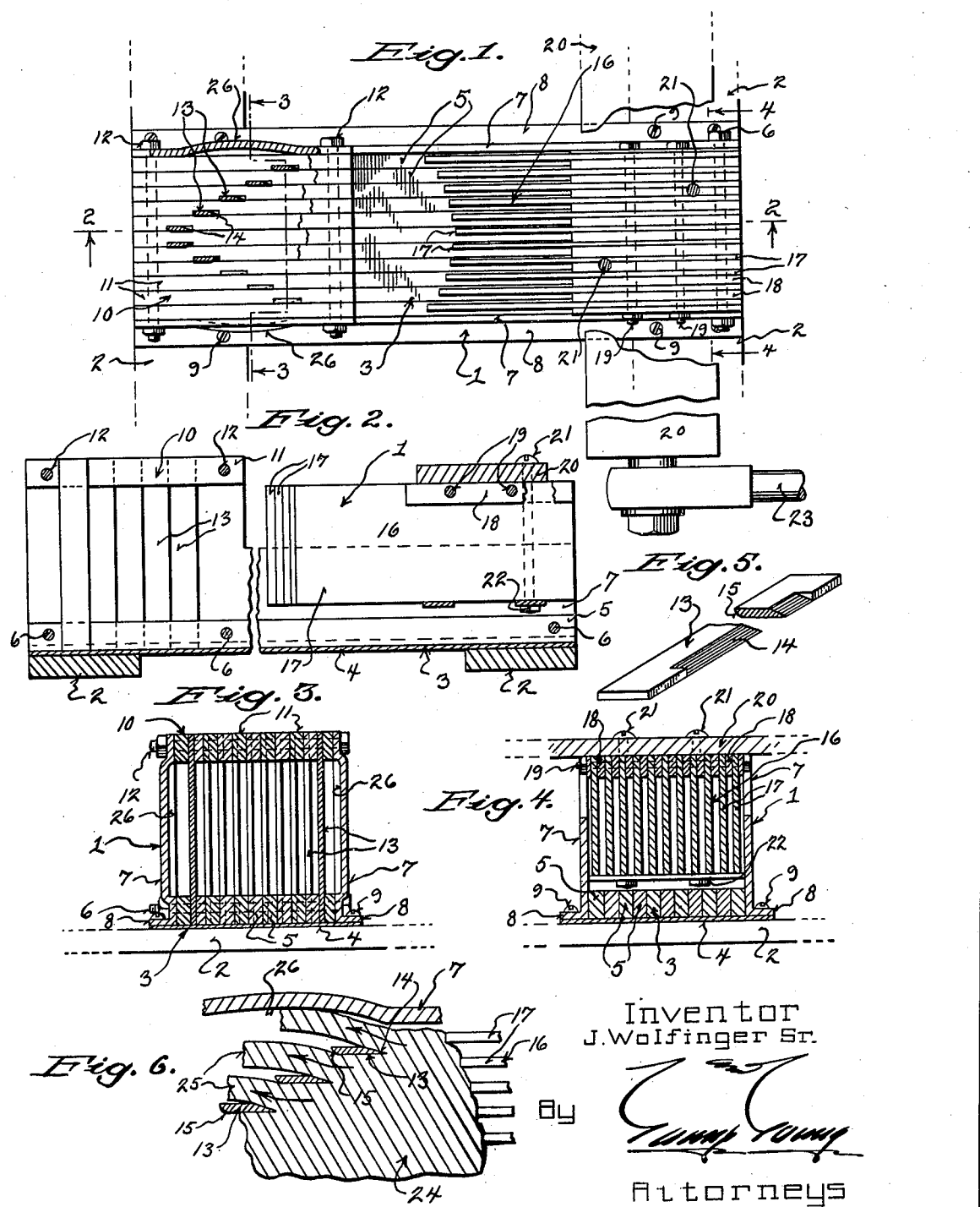
Inventor
J. Wolfinger Sr.
By
Attorneys Patented July 6, 1943

2,323,760

UNITED STATES PATENT OFFICE 2,323,760

VEGETABLE SLICER

Joseph Wolfinger, Sr., Dundas, Wis.; Frank F. Wolfinger, administrator of said Joseph Wolfinger, Sr., deceased Application May 20, 1940, Serial No. 336,195

1 Claim. (Cl. 146—169)

This invention pertains to vegetable or solid food products slicers, and more particularly to a device for slicing beets or similar vegetables of juicy content and relatively compact, cellular structure.

Heretofore, it has been customary in slicing vegetables of the foregoing character to force the same through a gang of line, parallel, wide cutting blades or plates, which results in a squeezing action upon the slices, forcing out an appreciable quantity of juices and vitamins, and reducing the natural flavor of the vegetable.

The primary object of the present invention is to provide a cutting unit for automatic vegetable slicing machines, which performs a slicing operation in the absence of any pressure upon the individual slices, thus retaining all of the natural ingredients of the vegetable.

Incidental to the foregoing, a more specific object is to provide a gang of parallel, stepped cutting blades through which the vegetables are forced, to progressively cut or peel slices from the body without exerting pressure upon the slices.

A further object resides in the novel construction of the blade and plunger carriers, whereby an extremely sturdy and rigid structure is provided, in which the blades and plungers can be readily removed for sharpening or replacement.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Figure 1 is a top plan view of a slicing device, incorporating one form of the present invention, parts being broken away and in section to more clearly illustrate structural details;

Figure 2 is a longitudinal section taken on the line 2—2 of Figure 1;

Figure 3 is a transverse section taken on the line 3—3 of Figure 1, illustrating the gang of cutting blades;

Figure 4 is a similar view taken on the line 4—4 of Figure 1, illustrating the plunger;

Figure 5 is a perspective view of one of the cutting blades; and

Figure 6 is a diagrammatic view illustrating slicing action.

Referring now more particularly to the accompanying drawing, the numeral 1 designates generally a cutting unit constructed in accordance with the preferred form of the present invention, the same being mouned upon spaced transverse supports 2 of a conventional slicing machine.

The slicer 1 comprises a base 3 consisting of a plate 4, upon which a plurality of longitudinally extending, abutting base strips 5 are supported. The strips 5 are secured together by transverse bolts 6, which also serve to connect side plates 7 to the base 3, said side plates having longitudinal flanges 8 secured to the base plate 4 and the transverse frame supports 2 by screws 9, or other suitable fastening means.

Adjacent to the rear end of the slicer, a supporting head 10, consisting of a plurality of abutted strips 11, is secured to the upper edges of the side plates 7 by transverse bolts 12. This supporting head 10 is arranged in spaced, parallel relation to the base strips 5.

Secured between the base strips 5 and the head strips 11 is a plurality of cutting blades 13 received in notches formed in the respective strips 5 and 11.

As will be noted in Figure 1, the knives 13 are positioned in stepped relation, with the cutting edge of one knife in substantial alinement with the rear edge of an adjacent knife. It will also be noted that the knives are arranged in a V-formation, which is preferable although not essential to the principle of the present invention, inasmuch as all of the knives could be arranged upon a diagonal line and function in the same manner as the arrangement illustrated.

As best shown in Figure 6, the forward cutting edges of the knives or blades 13 are beveled on their outer sides only, to provide inclined guide faces 14. The rear edges 15 of the knives or blades 13 are also rounded off or beveled toward their outer side faces, as at 15, to further facilitate the slicing operation without creating pressure upon the slices of the vegetable, as will be later described in connection with the operation of the invention.

By mounting the knives or blades 13 in the notches formed in the base strips 5 and the head strips 11, and by firmly binding the strips together by the bolts 6 and 12, the knives or blades 13 are firmly clamped in position against accidental movement or displacement. It will be noted that the base strips 5 extend beyond the upper head strips 11 to form a support for the vegetables to be sliced by a reciprocative plunger.

Mounted upon the base for reciprocatory movement is a slotted plunger 16 for the vegetables to force the same, one at a time, through the gang of cutting knives 13.

The plunger 16 includes a plurality of spaced, parallel plunger plates 17, and these plunger fingers are adapted to slide between the knives or blades 13 of the gang of cutting knives or blades. The plunger fingers 17 are held in their proper spaced relation by spacer strips 18, and the plunger plates and the spacer strips are all securely united by transversely extending clamping bolts 19. These strips 18 terminate decidedly short of the front leading edges of the plunger fingers, whereby the plunger fingers will have free, unrestricted movement between the gang of blades or knives 13. The plunger 16 operates between the side walls or plates 7 of the guide for the cutting unit, and the plunger is reciprocated back and forth in any preferred manner, by parts of the vegetable slicing machine (not shown).

However, it is to be noted that a crosshead 20 extends across the plunger, and is connected thereto by vertical bolts 21, which also extend through a bottom clamping plate 22. The crosshead 20 can be actuated by pitman rods 23. If preferred, the forward end of the plunger can be slightly rounded to conform to the configuration of the vegetable to be sliced.

In operation of the slicing machine, the vegetables are delivered one at a time into the guide between the gang of cutting knives or blades and the plunger 16, and upon forward movement of the plunger by the crosshead, the vegetable will be forced into engagement with the knives or blades 13. In view of the fact that the plunger is formed from spaced plunger plates, the vegetable will be forced entirely through and between the knife blades.

Particular attention is now invited to Figure 6 of the drawing, and it will be noted that as the beet or other vegetable is forced through the stationary knives, the knives will cut the body 24 of the vegetable into individual slices 25, and these slices will be automatically spread apart during the cutting operation. This is brought about by the beveling of the blades only on one side to form the inclined guide faces, and by rounding the inner corners of the blades at their rear edges thereof. As the slices are automatically spread apart, all squeezing action on the cut slices is eliminated. Hence, all of the juices of the vegetable slices will be retained. Consequently, the beet or other vegetable slices will retain all of the desirable vitamins and other food values.

In order to permit the end slices of the vegetable to move outwardly without being pressed, the side plates 7 of the guide for the cutting unit are bowed outwardly, as at 26, on opposite sides of the cutting knives or blades.

From the foregoing description, it can be seen that I have provided an exceptionally simple and efficient means for slicing beets and other vegetables without causing any pressure on the cut slices.

Changes and details may be made without departing from the spirit or scope of my invention, but what I claim as new is:

A vegetable slicer comprising a plurality of abutting base strips and a plurality of abutting head strips, the said base and head-strips having vertically aligned narrow knife receiving notches in V formation the length of the notches being parallel to the length of the base and head strips, the base strips being extended beyond the head strips to form a receiving table for vegetables, vertical side plates for the gangs of strips and transversely disposed bolts extending through the base strips and head strips and side plates for securing the parts together, knives terminating in said notches and extending between the base and head strips and a reciprocative slotted plunger mounted over the base strips adapted to force vegetables to be sliced through the knives.

JOSEPH WOLFINGER, Sr.